Jan. 30, 1934.  C. W. KELSEY  1,944,937
AGRICULTURAL IMPLEMENT
Filed Aug. 20, 1932  2 Sheets-Sheet 1
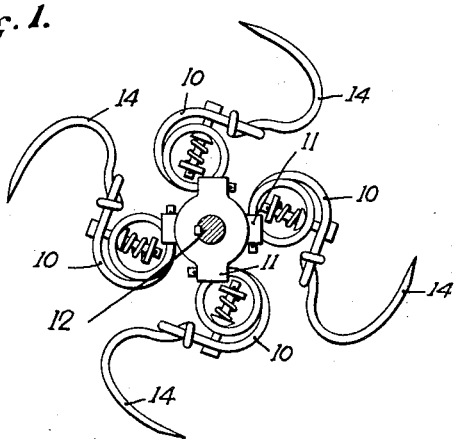
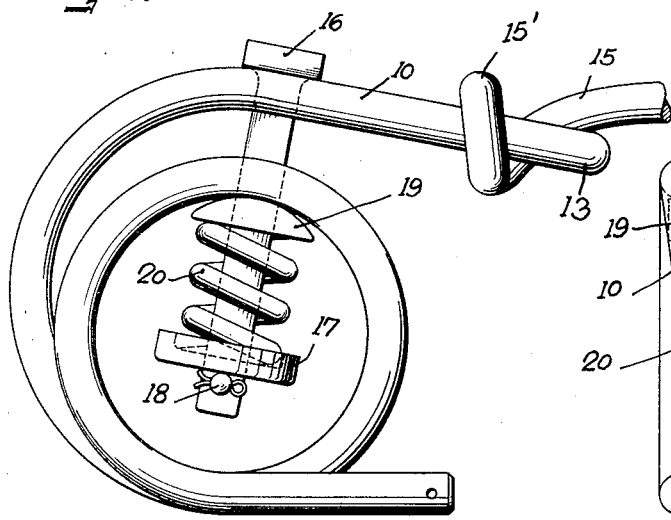
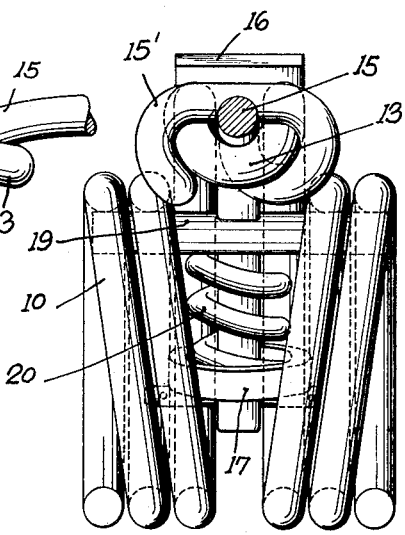
INVENTOR.
CADWALLADER WASHBURN KELSEY,
BY Duell, Dunn & Anderson.
ATTORNEYS.

Jan. 30, 1934.    C. W. KELSEY    1,944,937
AGRICULTURAL IMPLEMENT
Filed Aug. 20, 1932    2 Sheets-Sheet 2

INVENTOR.
CADWALLADER WASHBURN KELSEY,
BY
ATTORNEYS.

Patented Jan. 30, 1934

1,944,937

UNITED STATES PATENT OFFICE 1,944,937

AGRICULTURAL IMPLEMENT

Cadwallader Washburn Kelsey, Short Hills, N. J., assignor to Rototiller Inc., Long Island City, N. Y., a corporation of Delaware Application August 20, 1932. Serial No. 629,600

6 Claims. (Cl. 97—216)

This invention relates to a structurally and functionally improved implement and in its more specific aspects aims to provide an apparatus of this nature which will withstand long and hard usage and abuse and which is primarily intended for embodiment in a machine of the spring harrow type. When placed in such association, the present invention will serve to reduce, if not entirely eliminate, the question of tooth and tooth mounting breakage.

It is an object of the present invention to furnish an apparatus of this nature which will include relatively few parts, each individually simple and rugged in construction and capable of assemblage to furnish a compact unit operating over long periods of time with freedom from difficulties and which unit will be capable of being so at relatively low cost.

A further object of the invention is that of providing a unit of this nature which may be applied to apparatus as heretofore placed upon the market, as well as to new apparatus. In either association the present invention may include structures which will serve to maintain the parts of the apparatus—with which it is combined—in proper association and against the probability of detachment or displacement.

With these and other objects in mind, reference is had to the attached sheets of drawings illustrating practical embodiments of the invention and in which:—

Fig. 1 is a sectional view through the pack shaft of a harrow apparatus and showing the teeth and mounting in association therewith and also including a unit embodying one form of the present invention;

Fig. 2 is a side elevation of the tine mounting combined with one of the units as shown in Fig. 1;

Fig. 3 is an end view of the parts as shown in Fig. 2;

Figure 4:
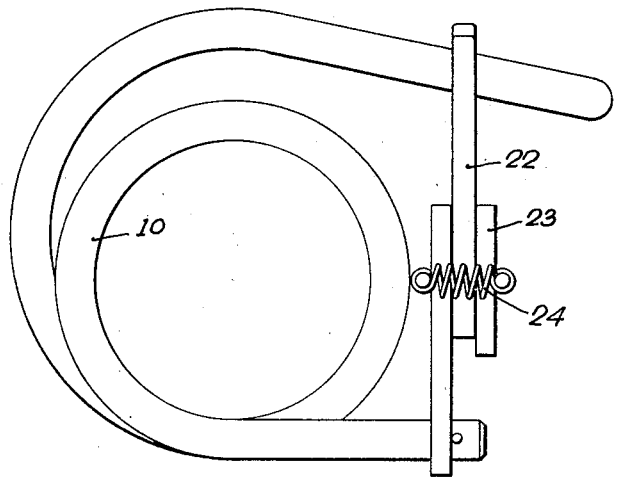
Fig. 4 is a view similar to Fig. 2 but showing a slightly different form of the invention than heretofore illustrated.

It has been found in connection with agricultural machines of the type employing rotary tilling means, that considerable difficulty has been experienced incident to the tines or tine mounting members of the apparatus breaking. More especially, such breakage has usually occurred when the machine was working on earth which contained rocks, roots or other non-severable obstructions. While the tine and/or mounting therefor, upon encountering such an obstruction, would bend rearwardly and without damage, these parts upon being released or freed from such obstruction would seek (incident to their inherent resiliency) to quickly reestablish their proper relative positions. Such reestablishment would ordinarily occur with great violence and as a consequence, the tine mounting would in certain instances break under the drastic flexing of the parts. This obviously resulted in expense of replacement and in delay in connection with rendering the entire apparatus again operative.

Further difficulties have also occurred incident to accidental relative displacement of the tine and mounting or in fact, detachment of the former from the latter. With this in mind, the present invention overcomes the latter objection in that it may embody a structure such that without due complication, the tine or other element is virtually locked against displacement with respect to its mounting. The primary noted objection is overcome by the present invention in that the rebound of the mounting and implement mounted thereby is checked, snubbed, retarded or limited in such a manner that a destructive flexing with consequent liability of breakage cannot occur.

This is contrary to the operation of certain types of apparatus which serve to prevent yielding movement of the tooth beyond predetermined limits. While necessarily limits do exist, it is the intention of the present invention to permit free yielding movement of the tooth so that no possibility of damage may occur to the latter incident to striking an obstruction. However, the present invention also contemplates the checking of the tooth rebound so that damage may not occur to the parts. Thus, referring to the drawings, it will be observed that the numeral 10 indicates a spring, the inner end of which may be suitably attached to the hub portions 11 of a power driven shaft 12. The outer end of the spring terminates in a loop portion 13 best shown in Fig. 3. Connected to this loop portion in the shank 15 of a cutting tool 14. Obviously, in lieu of the particular type of tool illustrated, any other form of implement or tooth might be secured to this portion of the spring. It is also apparent that the spring and tool might be formed of one continuous strip of metal, thus eliminating the necessity of a coupling of any nature. However, it is preferred, with a view to affording freedom of attachment and security of anchorage, that the inner end of the shank 15 terminate in a hook portion 15' which is threaded through the loop at the outer end of the spring 10, as has been best illustrated in Fig. 3.

With a view to checking the rebound of the spring 10, a unit may be associated with the same and which will extend between the inner and outer convolutions of this member. Referring to Figs. 1 to 3, the unit may include a head 16 forming a part of a bolt, to the inner end of which a washer or retaining plate 17 is secured, as for example, by means of a pin 18. Interposed between this washer or cup, a bearing plate 19, slidably mounted upon the bolt shank, is a spring 20. The bearing plate 19 extends in contact with the inner face of the spring convolution, while the head 16 overlies the outer portion of the spring 10. Accordingly, the spring will be free to be compressed, but an increasing resistance to expansion will be provided for by this unit. Accordingly, the spring rebound will be snubbed or checked. Additionally, by having the head 16 extend adjacent the hooked portion 15 of the tool an accidental detachment of the latter is precluded.

Figure 5:
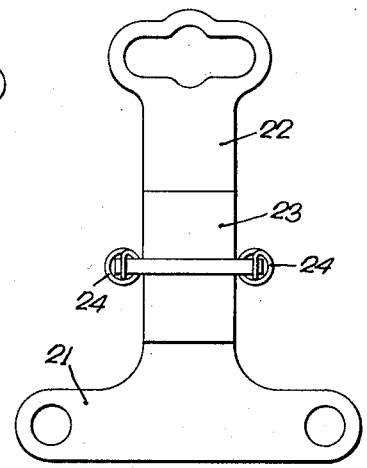
Fig. 5 is an end view of the unit as shown in Fig. 4.

Obviously, the different forms of construction which may be employed for the purpose of checking, snubbing, or cushioning the rebound of the spring are too numerous to permit of complete illustration. However, referring to Figs. 4 and 5, a form of unit different from that shown in Figs. 1 to 3 has been shown. In this form of unit a plate 21 is secured between the inner ends of the spring 10 and a second plate 22 extends towards the first plate and overlaps the same. A bearing member 23 is disposed in slidable contact with the outer face of the plate 22 and springs 24 connect the bearing member to the plate 21. Accordingly the outer end of the spring is free to move with reference to its inner end and within reasonable limits. However, in the case of a sudden rebound movement it will be obvious that the bearing member 23 will tend to clamp against the exterior face of the plate 22 and thus prevent any sudden rebound movement on the part of the spring. In this form of the invention an additional factor of value is present in that the same action will follow if one attempts to compress the spring beyond its elastic limits.

Figure 6:
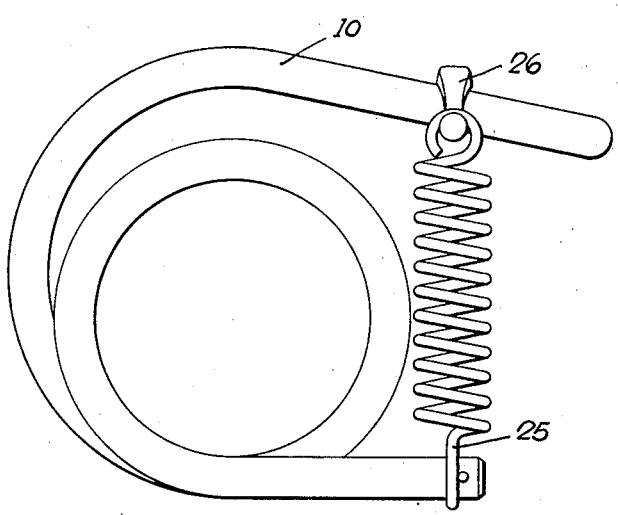
Fig. 6 is a view similar to Fig. 4 but showing a still different form of unit.
Figure 7:
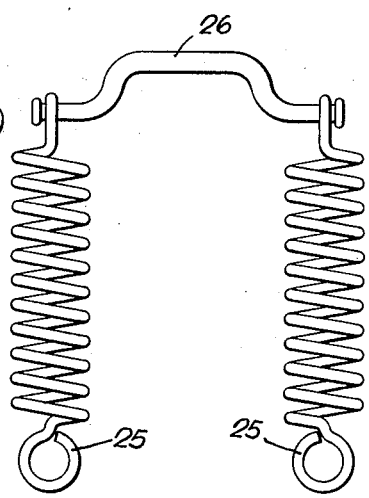
Fig. 7 is a view similar to Fig. 5 but illustrating the unit of Fig. 6.

In the form shown in Figs. 6 and 7, the inner ends of a pair of springs 25 are connected to the corresponding ends of the spring 10. A hook member 26 connects the outer ends of these springs and overlies the outer end of the spring 10. Accordingly, the rebound action will again be checked and cushioned. In all forms of the invention as illustrated the spring 10 will have its stability increased, which will contribute materially to the efficiency of the apparatus in operation.

Obviously, numerous changes in construction and rearrangement of the parts may be resorted to without departing from the spirit of the invention as defined by the claims.

Having described my invention, what I claim as new and desire to secure by Letters Patent is:

1. In an agricultural machine, in combination, a tool, a spring associated therewith and presenting a convolute structure and means engaging different spring portions for resisting an expansion of such convolutions.

2. In an agricultural machine, in combination, a tool, a spring associated therewith and presenting a convolute structure, a unit engaging different spring portions and comprising a bearing plate in contact with one of such portions, a head in contact with another of such portions and a compression spring yieldably coupling said head and plate to increasingly resist expansion of said convolutions beyond a predetermined point.

3. In an agricultural machine, in combination, a tool, a spring associated therewith and presenting a convolute structure, a friction assembly connected to different spring portions and means for causing an intimate contact between the parts of said assembly upon the convolutions of said spring being expanded beyond a predetermined limit.

4. In an agricultural machine, in combination, a tool, a spring associated therewith and presenting a convolute structure, a friction assembly connected to different spring portions and means for causing an intimate contact between the parts of said assembly upon the convolutions of said spring being contracted beyond a predetermined limit.

5. In an agricultural machine, in combination, a tool, a spring associated therewith and presenting a convolute structure, and yielding means connected to different spring portions for increasingly resisting expansion of the spring convolutions.

6. A rotary tilling device comprising a tool member, a shaft, a resilient member coupling said tool to said shaft, and means for checking the rebound of said resilient member, said last named means offering no resistance to the compression of said resilient member.

CADWALLADER WASHBURN KELSEY.